(12) United States Patent
Mori et al.

(10) Patent No.: US 8,510,007 B2
(45) Date of Patent: Aug. 13, 2013

(54) VEHICLE MOTION CONTROL DEVICE

(75) Inventors: Katsuyuki Mori, Ichinomiya (JP);
Mamoru Sawada, Yokkaichi (JP);
Toshiki Matsumoto, Kariya (JP);
Takeshi Sada, Toyota (JP)

(73) Assignee: Denso Corporation, Kariya (JP)

( * ) Notice: Subject to any disclaimer, the term of this patent is extended or adjusted under 35 U.S.C. 154(b) by 937 days.

(21) Appl. No.: 12/316,384

(22) Filed: Dec. 11, 2008

(65) Prior Publication Data

US 2009/0157246 A1 Jun. 18, 2009

(30) Foreign Application Priority Data

Dec. 12, 2007 (JP) ................................. 2007-321222

(51) Int. Cl.
*G06F 17/00* (2006.01)
*G06F 19/00* (2011.01)
*B60K 6/20* (2007.10)
*B60K 6/52* (2007.10)

(52) U.S. Cl.
USPC .............. 701/69; 701/89; 701/90; 180/65.21; 180/65.22; 180/65.25; 180/65.265; 280/5.515

(58) Field of Classification Search
USPC ................... 701/1, 36, 37, 48, 69, 70, 72, 74, 701/75, 82, 84, 89, 90, 93, 94; 180/65.21, 180/65.25, 65.26, 65.265, 65.275, 65.285, 180/197, 65.22; 280/5.507, 5.513, 5.515
See application file for complete search history.

(56) References Cited

U.S. PATENT DOCUMENTS

| 5,740,877 | A | * | 4/1998 | Sasaki ........................... 180/248 |
| 5,744,895 | A | * | 4/1998 | Seguchi et al. ............... 310/266 |
| 5,801,508 | A | * | 9/1998 | Obayashi ....................... 318/801 |
| 5,927,425 | A | * | 7/1999 | Kusano .......................... 180/248 |
| 6,102,144 | A | | 8/2000 | Lutz |

(Continued)

FOREIGN PATENT DOCUMENTS

| JP | 11-044229 | 2/1999 |
| JP | 2000-326840 | 11/2000 |

(Continued)

OTHER PUBLICATIONS

Office Action dated Sep. 24, 2009 in corresponding Japanese application No. 2007-321222.

(Continued)

*Primary Examiner* — Thomas Tarcza
*Assistant Examiner* — Edward Pipala
(74) *Attorney, Agent, or Firm* — Harness, Dickey & Pierce, PLC

(57) ABSTRACT

A vehicle motion control device adjusts vibrations occurring in components of a vehicle so as to control the motion of a vehicle having independent drive assemblies for front wheels and for rear wheels. The vehicle motion control device includes a base request torque calculation unit that calculates first and second base request torques in response to a request made by the driver of a vehicle. A correction torque calculation unit calculates first and second correction torques used to adjust vibrations in a low-frequency band and in a high-frequency band of the vibrations of the components of the vehicle. An internal combustion engine control unit and a motor generator control unit control an internal combustion engine and a motor generator so that the first and second base request torques are corrected with the first and second correction torques.

10 Claims, 9 Drawing Sheets

(56) References Cited

U.S. PATENT DOCUMENTS

| | | |
|---|---|---|
| 7,344,129 B2 | 3/2008 | Nemoto |
| 2001/0020789 A1 | 9/2001 | Nakashima |
| 2001/0025219 A1* | 9/2001 | Ohba et al. ............... 701/89 |
| 2002/0032512 A1* | 3/2002 | Shimada ................. 701/89 |
| 2002/0091471 A1 | 7/2002 | Suzuki |
| 2005/0200088 A1 | 9/2005 | Sawada et al. |
| 2006/0041353 A1 | 2/2006 | Sawada et al. |
| 2006/0047398 A1* | 3/2006 | Abe et al. ............... 701/69 |
| 2006/0052908 A1 | 3/2006 | Matsumoto et al. |
| 2006/0061464 A1 | 3/2006 | Okada et al. |
| 2006/0276941 A1* | 12/2006 | Sugita ...................... 701/1 |
| 2007/0027605 A1* | 2/2007 | Fodor et al. ............. 701/82 |
| 2007/0027606 A1* | 2/2007 | Fodor et al. ............. 701/82 |
| 2007/0173995 A1* | 7/2007 | Nakasako et al. ....... 701/36 |
| 2008/0223634 A1* | 9/2008 | Yamamoto et al. ..... 180/65.2 |
| 2008/0249690 A1 | 10/2008 | Matsumoto et al. |
| 2008/0289894 A1 | 11/2008 | Muta et al. |
| 2009/0255746 A1* | 10/2009 | Boesch .................... 180/197 |

FOREIGN PATENT DOCUMENTS

| | | |
|---|---|---|
| JP | 2001/037006 | 2/2001 |
| JP | 2002-058107 | 2/2002 |
| JP | 2002-325309 | 11/2002 |
| JP | 2003-018706 | 1/2003 |
| JP | 2003-129880 | 5/2003 |
| JP | 2004-208473 | 7/2004 |
| JP | 2005-256636 | 9/2005 |
| JP | 2005-256933 | 9/2005 |
| JP | 2006-060936 | 3/2006 |
| JP | 2006-069472 | 3/2006 |
| JP | 2006-256456 | 9/2006 |
| JP | 2006-280099 | 10/2006 |
| JP | 2008-254537 | 10/2008 |
| WO | WO 2007/091144 | 8/2007 |

OTHER PUBLICATIONS

Extended Search Report dated Jul. 16, 2012 in corresponding European Application No. 08021441.4.

* cited by examiner

VEHICLE MOTION CONTROL DEVICE

CROSS REFERENCE TO RELATED APPLICATIONS

The present application is based on and claims priority to Japanese Patent Application No. 2007-321222, filed on Dec. 12, 2007, the entire contents of which are incorporated herein by reference.

BACKGROUND OF THE INVENTION

1. Field of the Invention

The present invention relates to a vehicle motion control device and more specifically to a control device mounted in a four-wheel-drive vehicle having independent front wheel and rear wheel drive assemblies.

2. Description of the Related Art

It is known that when a vehicle is accelerated, decelerated, or turned, various vibrations can occur in the vehicle. Specifically, when a vehicle driver provides a motion command to the vehicle, for example by depressing the accelerator pedal, unnecessary motion of a vehicle body, such as a pitching motion, a vertical motion, or vibrations of tires can be made by the vehicle in addition to a motion associated with the running command.

Conventional technology, as described, for example, in JP-A-2006-60936, has been developed to prevent some unnecessary motion. In the described technology, a larger amount of engine energy than that actually required is generated. When an amount of energy associated with the unnecessary motion, such as pitching vibration, becomes positive, a motor generator is used as a generator to remove the pitching vibration energy suppressing the unnecessary motion. Moreover, when the amount of engine energy does not reach the required amount and the amount of pitching vibration energy becomes negative, the motor generator is used as a motor to supplement the engine energy removing the pitching vibration energy. Through the above actions, deterioration in vehicle behavior associated with the pitching vibration energy is prevented to stabilize vehicle motion.

A conventional vehicle motion control device is also known, as described below. Specifically, the vehicle motion control device is mounted in an electric four-wheel-drive vehicle the front wheels of which are driven by inducing a torque in an output shaft for the front wheels using an internal combustion engine, and the rear wheels of which are driven by inducing a torque in an output shaft for the rear wheels using a motor generator. On a so-called "low μ road," which is a road having a relatively low coefficient of friction against tires, when the vehicle is started in a low velocity band of, for example, 30 km/hour or less, a torque is induced in the output shaft for the rear wheels using the motor generator. By thus delivering a driving force to the rear wheels, a facility for assisting in start of the vehicle is realized.

When the unnecessary motion causes an oscillation in a load acting on tires, or especially, when the vehicle motion causes a body vibration in vertical direction, or during one of many other various factors causes unnecessary motion, vibration or movement, a problem arises as will be described in greater detail below.

Specifically, among forces capable of being transmitted to a road via tires, a frictional force generated between the tires and road has the largest magnitude. The magnitude of the frictional force is determined as a product of a load acting on the tires and a coefficient of friction. Therefore, if the load acting on the tires oscillates, the frictional force generated between the tires and road also oscillates meaning that the largest force to be transmitted to the road via the tires fluctuates. When the load acting on the tires does not oscillate, the frictional force can be entirely transmitted to the road via the tires. However, if the load acting on the tires oscillates, a part of the force may not be transmitted to the road. In such a situation, even when a torque can be faithfully induced in an output shaft via a drive assembly including an internal combustion engine or the like in response to a request made by a driver, the output may not be properly transmitted to the road via the tires and the acceleration of the vehicle may be disturbed. Thus, the unnecessary motion may bring about a disturbance in the acceleration of the vehicle and vehicle motion meeting the intention of the driver becomes difficult to achieve.

SUMMARY OF THE INVENTION

The present invention addresses the foregoing and other situations, and is intended to provide a vehicle motion control device that can control vibrations occurring in the components of a vehicle so as to control vehicle motion of, for example, a four-wheel-drive vehicle having a drive assembly for front wheels and a drive assembly for rear wheels that operate independently of each other, and that can realize vehicle motion which meets the intention of the driver of the vehicle.

In order to accomplish the above and other objects, a vehicle motion control device is mounted in a four-wheel-drive vehicle having a first drive assembly including an internal combustion engine inducing a torque in a first output shaft coupled to a first pair of wheels, and a second drive assembly including a motor generator inducing a torque in a second output shaft coupled to a second pair of wheels, and being independent of the first drive assembly, and a vehicle state detection means for detecting the states of the components of a vehicle, and for controlling motion of the vehicle. In accordance with various embodiments, the vehicle motion control device includes a base request torque calculation unit that calculates a first base request torque for the first drive assembly and a second base request torque for the second drive assembly, in response to a request made by the driver of the vehicle from an input device such as an accelerator pedal that can correspond, for example, to a throttle valve opening position. The vehicle motion control device further includes a correction torque calculation unit that estimates the vibrational states of the components of the vehicle on the basis of the states of the components detected by the vehicle state detection means, and that calculates a first correction torque for the first base request torque used to adjust vibrations, such as, for example, to increase or decrease vibrations in a low-frequency band of the vibration frequencies of the components of the vehicle, and that calculates a second correction torque for the second base request torque used to adjust vibrations in a high-frequency band of the vibrations of the components of the vehicle. The vehicle motion control device further includes first and second control units that control the internal combustion engine and motor generator respectively so that the first and second base request torques which the first and second drive assemblies should output will be corrected with the first and second correction torques.

In the above described embodiment of the exemplary vehicle motion control device, the first base request torque, being corrected with the first correction torque, is induced in a first output shaft. It should be understood that the first base request torque is calculated in response to a request made by the driver of the vehicle, and the first correction torque is a compensated torque to be used to adjust the vibrations in the low-frequency band of the vibrations of the components of the vehicle. The first base request torque corrected with the first correction torque is induced in the first output shaft using the first drive assembly including the internal combustion engine. Consequently, while the request of the driver is met, the vibrations in the low-frequency band such as a pitching motion of the vehicle and a bouncing motion thereof can be increased, decreased or otherwise controlled.

Further in accordance with various embodiments of the exemplary vehicle motion control device, the second base request torque corrected with the second correction torque is induced in a second output shaft. Herein, the second basis request torque is calculated in response to a request made by the driver of the vehicle, and the second correction torque is a compensated torque to be used to adjust natural vibrations in a high-frequency band of the vibrations of the components of the vehicle. The second base request torque corrected with the second correction torque is induced in the second output shaft using the second drive assembly including the motor generator. Consequently, the request of the driver can be met and the vibrations in the high-frequency band such as vibrations of tires can be increased, decreased or otherwise controlled.

Since the vibrations in the low-frequency band and in the high-frequency band are controlled, an oscillation associated with a load acting on the tires can be controlled. The contact state of the tires with a road and, correspondingly, the largest force to be transmitted to the road via the tires can be controlled. Consequently, the acceleration of the vehicle can be controlled. Through operation of the above described control, vehicle motion that meets the intention of the driver of the vehicle can be achieved.

The correction torque calculation unit advantageously calculates the first correction torque on the basis of a low-frequency band model in which the behaviors of the components of the vehicle in the low-frequency band are modeled. The second correction torque is advantageously calculated on the basis of a high-frequency band model in which the behaviors of the components of the vehicle in the high-frequency band are modeled.

Specifically, a first spring-mass model, in which vibrations of a vehicle body accommodating occupants are modeled, can be adopted as the low-frequency band model. The first drive assembly calculates the first correction torque for causing vibrations occurring in the first spring-mass model to adjust on the basis of the conditions of the vibrations occurring in the first spring-mass model. Consequently, the stability of the vehicle or the turning ability thereof can be controlled.

A second spring-mass model, in which vibrations associated with spring coupling between a chassis frame bearing a vehicle body, wheels joined to the chassis frame and vibrations of elastic tires coupled to wheels are modeled, should be adopted as the high-frequency band model. In such a case, the second drive assembly calculates the second correction torque for causing the vibrations occurring in the second spring-mass model to adjust on the basis of the conditions of the vibrations occurring in the second spring-mass model. The motion stability of the vehicle or the turning ability thereof can be further controlled.

In accordance with various embodiments, the four-wheel-drive vehicle advantageously includes a power storage means connected to the motor generator in order to feed power to the motor generator, and a generator that uses the torque of the first output shaft to generate power for charging the power storage means, and that offers a higher frequency response than the internal combustion engine. Consequently, the first base request torque can be readily corrected using the first correction torque.

The vehicle motion control device further includes a generator request torque calculation unit that calculates, as a third base request torque, an amount of torque required by the generator for generating an amount of electricity needed to retain an amount of stored power at a predetermined reference value on the basis of the amount of stored power of the power storage means and the power generation efficiency of the generator. The first control unit controls the internal combustion engine so that the first base request torque will be corrected with the third base request torque. Consequently, the amount of stored power of the power storage means can be retained at or above the reference value.

The generator request torque calculation unit calculates an excess torque which the internal combustion engine can induce in the first output shaft in addition to the first base request torque. If the smaller one of the excess torque and the required torque is adopted as the third base request torque, an amount of torque at least equal to the excess torque included in the torque induced in the first output shaft can be used to generate power that can be stored in the power storage means.

When the amount of stored power of the power storage means falls below the reference value, the first control unit performs correction based on the first base request torque plus the third base request torque with a higher priority than performing correction based on the first base request torque plus the first correction torque. Consequently, the amount of stored power of the power storage means can be quickly restored.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

Figure 1:
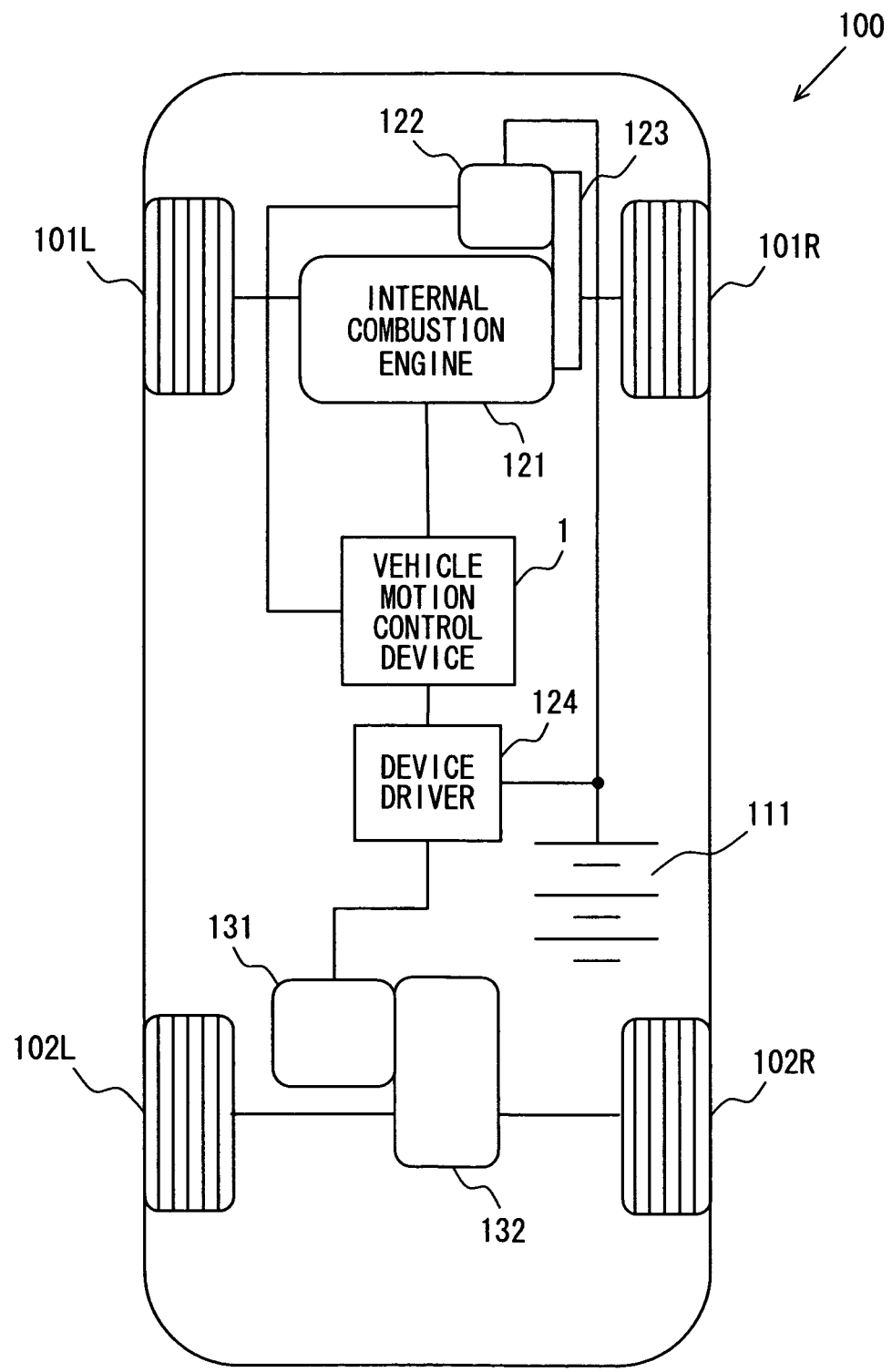
FIG. 1 is a diagram illustrating an exemplary vehicle motion control device mounted in a four-wheel-drive vehicle in accordance with an embodiment.

Referring to FIG. 1 to FIG. 8, an embodiment of a vehicle motion control device will be described below. FIG. 1 shows an example of the constitution of a vehicle in which the vehicle motion control device of the present embodiment is mounted. The vehicle will first be described.

A vehicle 100, as shown in FIG. 1, is a four-wheel-drive vehicle, and includes a battery 111 that can act as a power storage means, an internal combustion engine 121 that can act as a first drive assembly, an alternator 122 that can act as a generator or the first drive assembly, a motor generator 131 that can act as a motor, and a vehicle state detection means not specifically shown in FIG. 1.

The battery 111 is connected to and feeds power to drive various pieces of onboard equipment that are not specifically shown, the various pieces of onboard equipment. The battery 111 is connected to the alternator 122, which can act as a generator as will be described hereinafter, and power, in the form of electrical energy originating from the alternator 122, is stored in the battery 111. Further, the battery 111 is connected to the motor generator 131, which can act as a motor, via a device driver 124 to be described later. The motor generator 131 functions as a motor by using power stored in and fed from the battery 111. When the motor generator 131 functions as a generator, power originating from the motor generator 131 is stored in the battery 111. In the present embodiment, the battery is adapted as a power storage means however, the storage function is not limited to being carried out by a battery. For example, a large-capacity capacitor may be adapted for use as the power storage means.

The spark ignition type internal combustion engine 121, hereinafter referred to as the internal combustion engine 121, induces a torque in a first output shaft (not shown) coupled to, for example, a pair of front wheels 101L and 101R, which can act as a first pair of wheels, via a transaxle and axles (not shown), and thus produces a driving force with which the pair of front wheels 101L and 101R is rotated. The internal combustion engine 121 or more particularly an air intake system offers a frequency response of approximately 5 Hz or less, and induces a torque in a low-frequency band in the first output shaft. Since the internal combustion engine 121 is already known, the details will be omitted.

The alternator 122 has a known fundamental constitution and is joined to the first output shaft of the internal combustion engine 121 over, for example, a belt 123 that can act as a transmission means, uses the torque of the first output shaft to originate power, and charges the battery 111 with the power. However, the alternator 122 of the present embodiment has the length and thickness of a winding determined in order to reduce the impedance of a coil included in the alternator 122. The frequency of power capable of being originated by utilizing the torque of the first output shaft is higher than that generated by an ordinary alternator, for example, is 10 Hz or higher. Namely, the frequency response of the alternator 22 is set to a band higher than the band of the frequency response of the internal combustion engine 121. Thus, the first drive assembly includes the internal combustion engine 121 and alternator 122.

The motor generator 131 is connected to the battery 111 via the device driver 124, is fed power from the battery 111, induces a torque in a second output shaft (not shown) and is coupled to, for example, a pair of rear wheels 102L and 102R that can act as a second pair of wheels via a speed-change differential mechanism 132, and produces a driving force with which the pair of rear wheels 102L and 102R is rotated. In accordance with an exemplary embodiment as described herein, a frequency response of the motor generator 131 can be set to 10 Hz or more or at least can be set to a higher band than the internal combustion engine 121. The motor generator 131 induces a torque in a high-frequency band in the second output shaft. It should be noted that the motor generator 131 applies the same torque to each of the rear wheels 102L and 102R via the speed change differential mechanism 132. The motor generator 131 not only has the capability of a motor that receives power fed from the battery 111 so as to induce a torque in the second output shaft but also has the capability of a generator that uses the torque of the second output shaft to originate power so as to charge the battery 111. Whether the motor generator 131 should function as motor or generator is determined by the vehicle motion control device 1 to be described later and is controlled by the device driver 124, which receives a command sent from the vehicle motion control device 1. Since the motor generator 131 is already known, the details thereof will be omitted. The second drive assembly includes the motor generator 131.

Moreover, the vehicle 100 includes, as various portion of a vehicle-state detection means that can detect the states of the components of the vehicle 100, an accelerator stroke sensor that detects a stroke or degree by which the driver of the vehicle 100 presses on the accelerator pedal, a number-of-revolutions sensor that detects the number of revolutions of the internal combustion engine 121 in a period of time, a steering angle sensor that detects the steering angle of the steering wheel (not shown), and other various sensors (not shown). The accelerator stroke sensor is connected and outputs the detected stroke of the accelerator pedal to the vehicle motion control device 1. The number-of-revolutions sensor is connected and outputs the detected number of revolutions to the vehicle motion control device 1. The steering angle sensor is connected and outputs the detected steering angle of the steering wheel to the vehicle motion control device 1. Further, the other various sensors are connected and output various sensor output values to the vehicle motion control device 1.

Next, the vehicle motion control device 1 to be mounted in the vehicle having the foregoing constitution will be described below.

Figure 2:
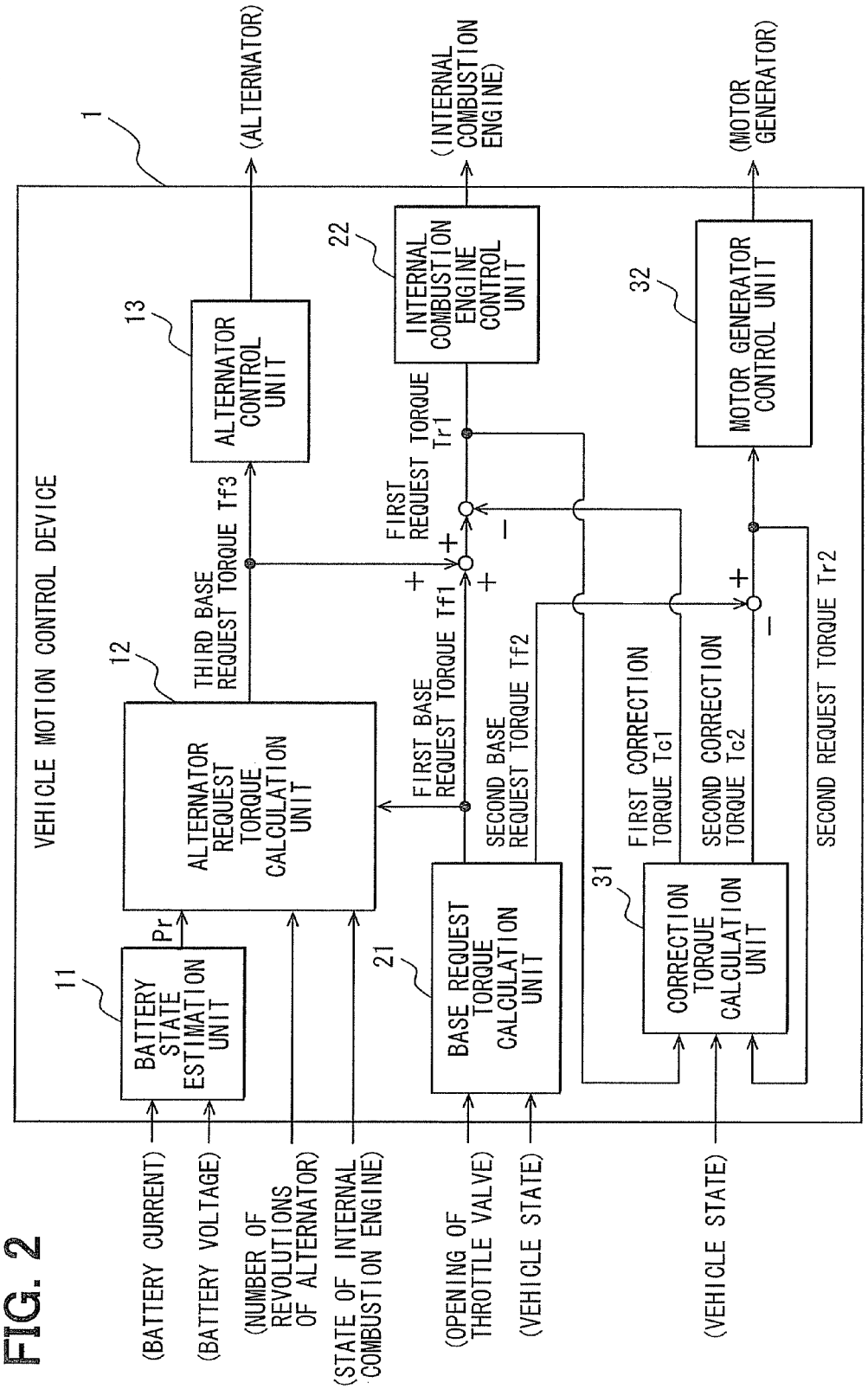
FIG. 2 is a block diagram illustrating an exemplary vehicle motion control device of an embodiment.

The vehicle motion control device 1 includes, as shown in FIG. 2, a base request torque calculation unit 21 that calculates a first base request torque Tf1, which is a base request torque for the first drive assembly, and a second base request torque Tf2, which is a base request torque for the second drive assembly. The first base request torque Tf1 and the second base request torque Tf2 are calculated on the basis of a condition of an input device such as the stroke of the accelerator pedal detected by the accelerator stroke sensor (not shown), which can also act as a sensor to determine, for example, the opening of the throttle valve.

Incidentally, an increase of the stroke of the accelerator pedal signifies that the driver of the vehicle 100 is requesting that the first and second drive assemblies to induce a larger output shaft torque. The values of the first base request torque Tf1 and second base request torque Tf2 are therefore increased. On the other hand, a decrease of the stroke of the accelerator pedal signifies that the driver of the vehicle 100 is not requesting that the first and second drive assemblies induce a large output shaft torque. The first base request torque Tf1 and second base request torque Tf2 do not therefore have very large values.

Based on the detected state of the vehicle, the base request torque calculation unit 21 calculates the maximum value T1max and minimum value T1min of a torque which the internal combustion engine 121 can induce in the first output shaft. When the first base request torque Tf1 calculated based on the stroke exceeds the maximum value T1max, the base request torque calculation unit 21 sets the first base request torque Tf1 to the maximum value T1max. When the first base request torque Tf1 falls below the minimum value T1min, the base request torque calculation unit 21 sets the first base request torque Tf1 to the minimum value T1min. Specifically, the magnitude of the first base request torque Tf1 calculated based on the stroke is restricted to be an intermediate value between the maximum value T1max and minimum value T1min attained at that time. Thus, a proper value can be calculated as the first base request torque Tf1.

Likewise, the base request torque calculation unit 21 stores and holds the maximum value T2max of the second base request torque Tf2 and the minimum value T2min thereof in an appropriate storage holding means (not shown). When the second base request torque Tf2 calculated based on the stroke exceeds the maximum value T2max, the base request torque calculation unit 21 sets the second base request torque Tf2 to the maximum value T2max. On the other hand, when the second base request torque Tf2 falls below the minimum value T2min, the base request torque calculation unit 21 sets the base request torque Tf2 to the minimum value T2min. Namely, the magnitude of the second base request torque Tf2 calculated based on the stroke is restricted to be an intermediate value between the maximum value T2max and minim value T2min attained at that time. Thus, a proper value can be calculated as the second base request torque Tf2.

Incidentally, the components of the vehicle 100 vibrate due to various factors, for example, rapid acceleration or deceleration of the vehicle 100 and the irregularities of a road. When a load acting on the tires oscillates due to the vibrations of the vehicle 100 or any other various factors, problems described below arise.

Specifically, among forces capable of being transmitted to a road via the tires, a frictional force generated between the tires and road is the largest in magnitude. The magnitude of the frictional force is determined as a product of a load acting on the tires and a coefficient of friction. Therefore, when the load acting on the tires oscillates, the frictional force generated between the tires and road also oscillates meaning that the largest force to be transmitted to the road via the tires fluctuates. If the load acting on the tires does not oscillate, the frictional force can be entirely transmitted to the road via the tires. However, since the load acting on the tires oscillates, part of the frictional force is not transmitted to the road. Accordingly, in an oscillation situation, even if the first base request torque Tf1 and second base request torque Tf2 can be faithfully induced in the first and second output shafts respectively by the first and second driving assemblies in response to a request made by the driver of the vehicle, the outputs are not correctly transmitted to the road via the tires. Thus, the vibrations of the components of the vehicle may bring about the disturbance in the acceleration of the vehicle 100. It becomes difficult to realize vehicle motion that meets the intention of the driver of the vehicle 100.

In the present embodiment, the vehicle motion control device 1 includes a correction torque calculation unit 31 that estimates the vibrational states of the components of the vehicle 100 on the basis of the states of the components of the vehicle detected by the various sensors, and that calculates a first correction torque Tc1 for the first base request torque Tf1 which is an AC component and which is used to minimize vibrations in a low-frequency band of the vibrations of the components of the vehicle 100, and a second correction torque Tc2 for the second base request torque Tf2 which is used to minimize vibrations in a high-frequency band of the vibrations of the components of the vehicle 100.

Figure 3:
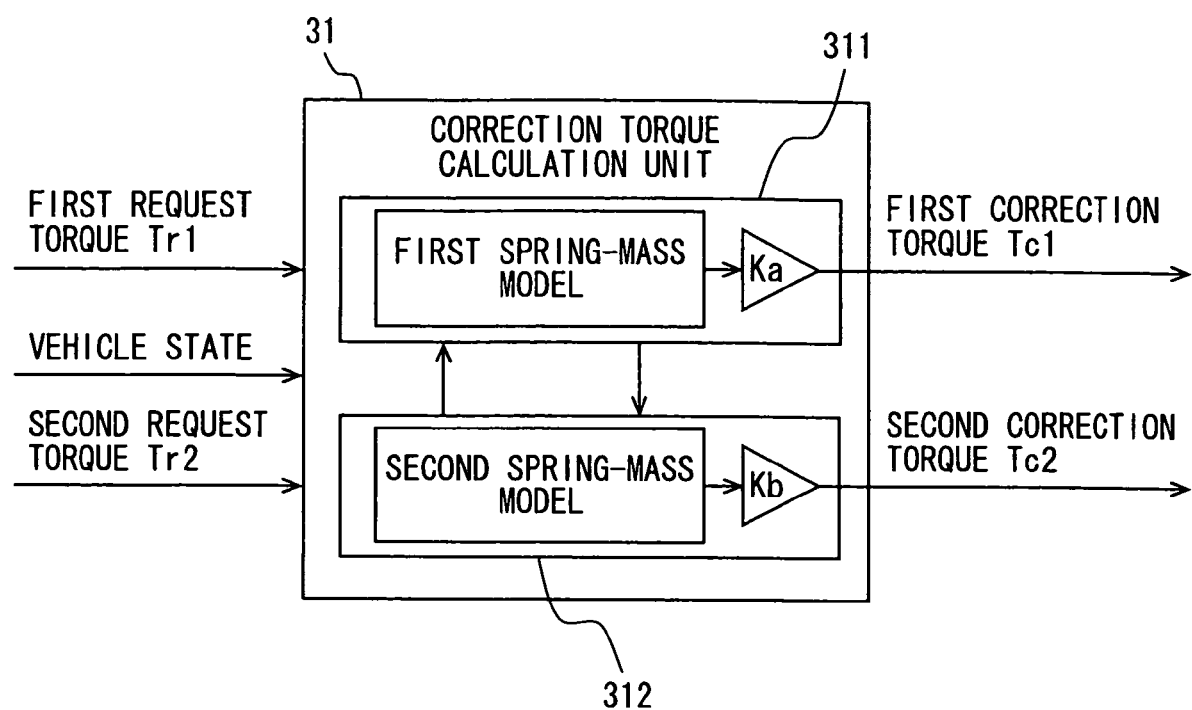
FIG. 3 is a block diagram illustrating a correction torque calculation unit of a vehicle motion control device of an embodiment.

FIG. 3 shows the internal constitution of the correction torque calculation unit 31, which includes a low-frequency vibration control block 311 that calculates the first correction torque Tc1 on the basis of a low-frequency band model in which behaviors of low-frequency band components of the vehicle 100 are modeled and also includes a high-frequency vibration control block 312 that calculates the second correction torque Tc2 on the basis of a high-frequency band model in which behaviors of high-frequency band components of the vehicle 100 are modeled. To be more specific, in the present embodiment, a first spring-mass model, in which the vibrations of a vehicle body accommodating occupants are modeled, is adopted as the low-frequency band model, and a second spring-mass model, in which a chassis frame bearing the vehicle body, wheels joined to the chassis frame and four elastic tires joined to the wheels, are modeled is adopted as the high-frequency band model.

Specifically, in the present embodiment, an exemplary control system is not designed based on a vehicle model in which the entire vehicle 100 is modeled, but rather is designed based on each of the first and second spring-mass model mass that are small-scale models into which the entire vehicle 100 is divided. Consequently, data concerning the vibrational states of the components of the vehicle 100 detected by the various sensors, and a first request torque Tr1 to be described later are inputted to the low-frequency vibration control block 311 included in the correction torque calculation unit 31. The data associated with the vibrational states of the components of the vehicle 100 detected by the various sensors, and a second request torque Tr2 to be described later are inputted to the high-frequency vibration control block 312 included in the correction torque calculation unit 31. Namely, a torque induced by the first driving assembly and suitable for suppressing low-frequency vibrations is regarded as a principal input of the first spring-mass model, and a torque induced by the second drive assembly and unsuitable for suppressing the low-frequency vibrations is regarded as a disturbing input of the second spring-mass model. The control system is designed using, for example, Linear Quadratic Regulator known as an optimal regulator. Likewise, a torque that is induced by the second drive assembly and suitable for suppressing high-frequency vibrations is regarded as a principal input of the second spring-mass model, and a torque that is induced by the first drive assembly and unsuitable for suppressing the high-frequency vibrations is regarded as a disturbing input of the first spring-mass model. The control system is designed using, for example, Linear Quadratic Regulator. In the present embodiment, for example, the Linear Quadratic Regulator is adopted in order to design the control system for each of the first and second spring-mass models. However, the present invention is not limited to the above described control system. Any model-based control system designing technique can be adopted.

It should be noted that when the vehicle 100 is turned, since a load acting on the tires of diagonal wheels is likely to oscillate due to, for example, a rolling motion of the vehicle, or the like, it becomes difficult to realize vehicle motion that meets an intention of a driver.

When the vehicle 100 is turned, the correction torque calculation unit 31, as described above, calculates the second correction torque Tc2 that causes a vibration, which occurs in the wheel on the side of the turning direction of the pair of rear wheels 102L and 102R, to increase and that causes a vibration, which occurs in the wheel on the side opposite to the side of the turning direction of the pair of rear wheels 102L and 102R, to decrease. Further, when the vehicle 100 is turned, the correction torque calculation unit 31 calculates the first correction torque Tc1 that causes a vibration, which occurs in the wheel on the side of the turning direction of the pair of front wheels 101L and 101R, to decrease and that causes a vibration, which occurs in the wheel on the side opposite to the side of the turning direction of the pair of front wheels 101L and 101R, to increase.

Normally, the motor generator 131 applies a torque to the pair of rear wheels 102L and 102R via, for example, the speed change differential mechanism 132. Therefore, the motor generator 131 cannot apply torques that are different from each other in amplitude or phase to the respective wheels or the left and right wheels respectively, but applies a torque at the same amplitude and same phase. While the vehicle is run, vibrations that are different from one another in the amplitude and phase are liable to occur in the left and right wheels. However, since the natural frequencies of the left and right wheels are substantially identical to each other, when a torque is applied at the same amplitude and phase and at substantially the same frequency as the natural frequency in accordance with resonance, the vibration of one of the left and right wheels can be decayed and the vibration of the other wheel can be amplified. Conversely, the natural vibration of one of the left and right wheels can be amplified and the vibration of the other wheel can be decayed. In other words, the same torque is applied to the second output shaft, which is coupled to the pair of rear wheels 102L and 102R, whereby the vibrations of the respective wheels can be increased or decreased in opposite relation as described above. Herein, the motor generator 131 included in the second drive assembly has been described. The same applies to the first drive assembly including the internal combustion engine 121 and alternator 122. The same torque is applied to the first output shaft, which is coupled to the pair of front wheels 101L and 101R, whereby the vibrations of the respective wheels can be increased or decreased in opposite relation as described above.

A vibration occurring in the one of rear wheels 102L and 102R on the side of the turning direction is increased, and an oscillation exhibited by a load acting on the tire is increased. A vibration occurring in the one of rear wheels 102L and 102R on the side opposite to the turning direction is decreased, and an oscillation exhibited by a load acting on the tire is decreased. Therefore, the tire on the side opposite to the turning direction comes into contact with a road more stably than the tire on the side of the turning direction. Moreover, a vibration occurring in the one of front wheels 101L and 101R on the side of the turning direction is decreased, and an oscillation exhibited by a load acting on the tire is decreased. A vibration occurring in the one of front wheels 101L and 101R on the side opposite to the turning direction is increased, and an oscillation exhibited by a load acting on the tire is increased. Therefore, the tire on the side of the turning direction comes into contact with a road more stably than the tire on the side opposite to the turning direction. In accordance with the present embodiment, a yaw moment exhibited by the vehicle 100 in the turning direction can be increased and the turning performance of the vehicle can be improved.

The vehicle motion control device 1 includes, as shown in FIG. 2, an internal combustion engine control unit 22 that can act as a first control unit, and an alternator control unit 13 that can control the internal combustion engine 121 and alternator 122 respectively so that the first base request torque Tf1 can be corrected with the first correction torque Tc1, and a motor generator control unit 32 that can act as a second control unit and can control the motor generator 131 so that the second base request torque Tf2 can be corrected with the second correction torque Tc2.

As shown in FIG. 1, the vehicle 100 includes the alternator 122, which uses part of a torque induced in the first output shaft by the internal combustion engine 121 to originate power, and thus retains the amount of stored power of the battery 111 at least at a reference value Eth [J]. The electrical energy stored in the battery 111 is fed to the various onboard equipment (not shown). During efforts to suppress the vibrations occurring in the components of the vehicle 100, the amount of stored power of the battery 111 should be taken into consideration, since the operations of the various pieces of onboard equipment may become unstable, for example, in the event that the stored power drops to a low level due to the efforts.

In the present embodiment, the vehicle motion control device 1 includes, as shown in FIG. 2, a battery state estimation unit 11 and an alternator request torque calculation unit 12 for the purpose of preventing the operations of the various onboard equipment from being unstable.

Specifically, a current sensor and a voltage sensor (not shown) disposed at the electrodes of the battery 111 (not shown) are connected in the stage preceding the battery state estimation unit 11, and the alternator request torque calculation unit 12 is connected in the stage succeeding the battery state estimation unit 11. The battery state estimation unit 11 fetches a current value and a voltage value of electrical energy stored in the battery 111 from the current sensor and voltage sensor, and calculates an estimate Ebat [J] of the amount of stored power. The battery state estimation unit 11 then calculates a requested amount of power Er [J] that is a short amount of power by which the estimate Ebat of the amount of currently stored power is smaller than the reference value Eth, and outputs the thus calculated requested amount of power Er to the alternator request torque calculation unit 12. Namely, the battery state estimation unit 11 calculates the estimate Ebat of an amount of power stored in the battery 111. When the estimate Ebat exceeds the reference value Eth, the battery state estimation unit 11 set the requested amount of power Er to zero. On the other hand, when the estimate Ebat is equal to or smaller than the reference value Eth, Pr=F(Eth−Ebat) is calculated. The result is designated as a request power Pr [W]. Incidentally, a function F(x) for converting a difference obtained by subtracting the estimate Ebat from the reference value Eth, into a power level is an arbitrary conversion function and "x" denotes an argument.

The alternator request torque calculation unit 12 fetches the request power Pr from the battery state estimation unit 11 connected in the preceding stage, and calculates a power generation efficiency Ea by fetching the number of revolutions per unit hour from the alternator 122 connected in the preceding stage. The alternator request torque calculation unit 12 calculates a required torque Ta1, which is a torque the alternator 122 requires for originating the request power Pr, in consideration of the power generation efficiency Ea. The alternator request torque calculation unit 12 fetches data concerning the state of the internal combustion engine 121 from the various sensors connected in the preceding stage, and calculates a maximum torque Tmax which the internal combustion engine 121 can induce in the first output shaft at the time of fetching. The alternator request torque calculation unit 12 fetches the first base request torque Tf1 from the base request torque calculation unit 21, and calculates an excess torque Ta2 by subtracting the first base request torque Tf1 from the calculated maximum torque Tmax. The alternator request torque calculation unit 12 outputs a smaller one of the required torque Ta1 and excess torque Ta2 as a third base request torque Tf3 to the alternator control unit 13 and internal combustion engine control unit 22 connected in the succeeding stage.

Moreover, the vehicle motion control device 1 includes, as shown in FIG. 2, the alternator control unit 13 that controls the alternator 122 so that the alternator 122 will use a torque, which can act as the third base request torque Tf3 and is induced in the first output shaft, to originate power.

Figure 4:
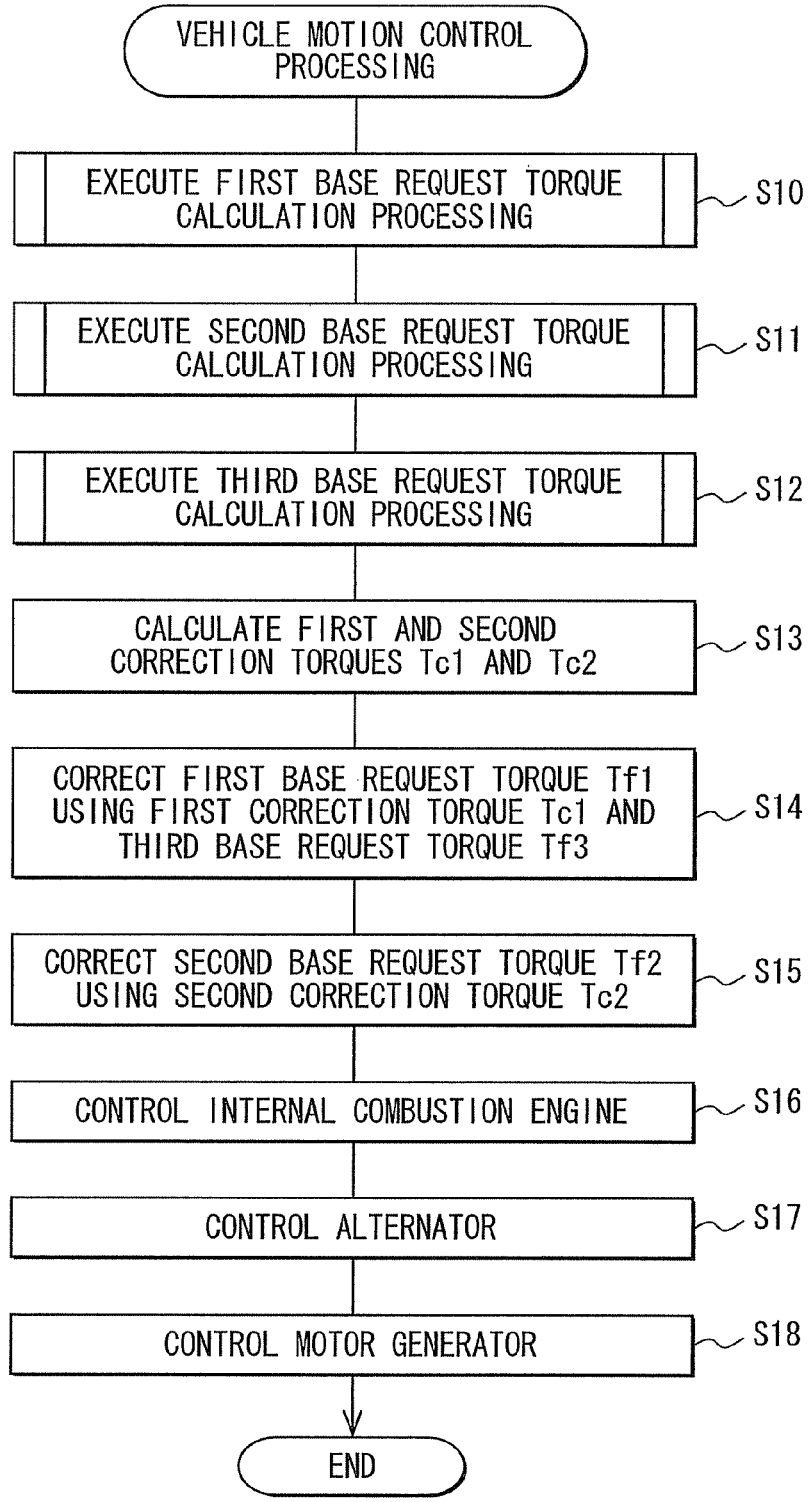
FIG. 4 is a flowchart illustrating exemplary vehicle motion control processing of an embodiment.
Figure 6:
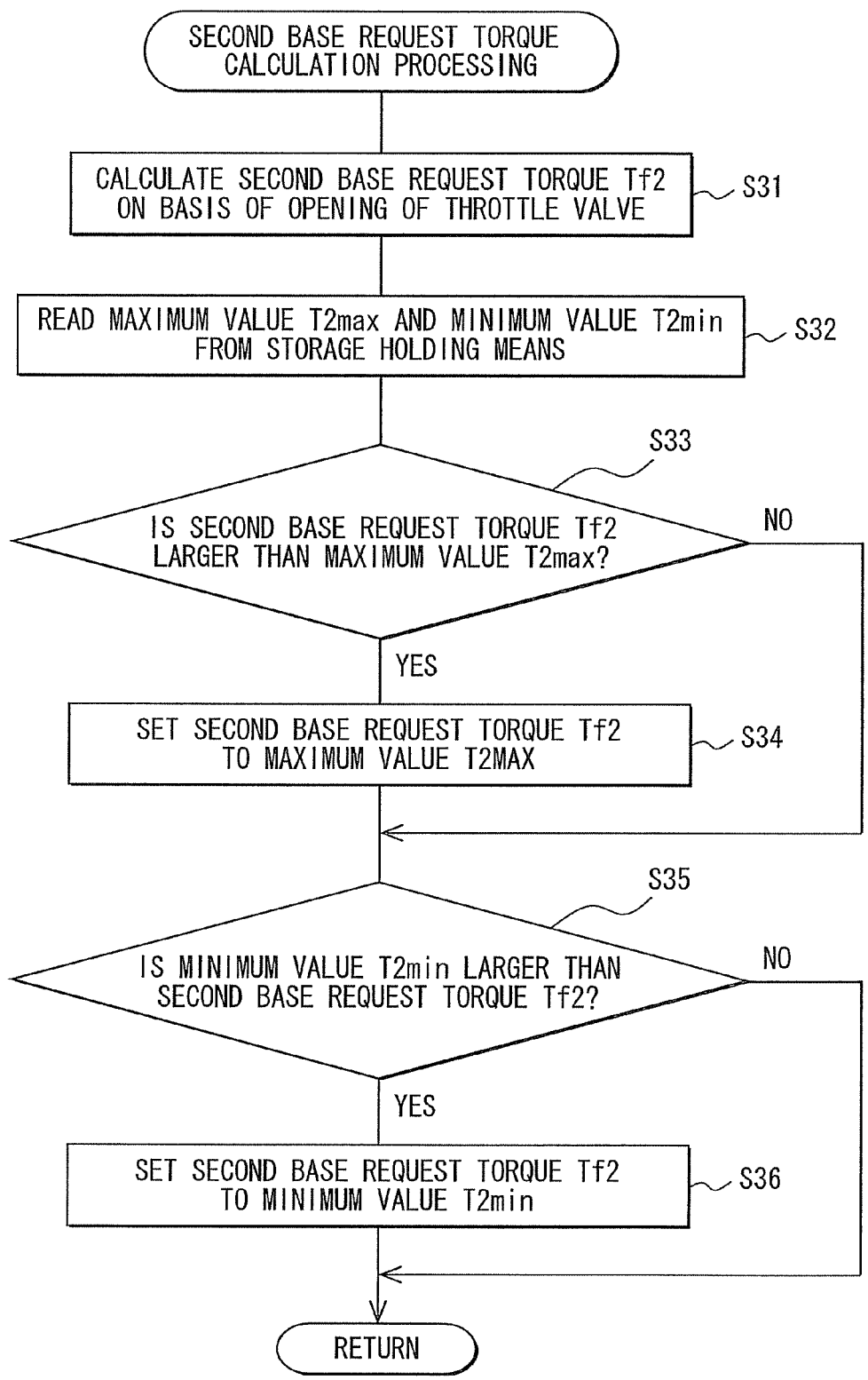
FIG. 6 is a flowchart illustrating exemplary second base request torque calculation processing of an embodiment.
Figure 7:
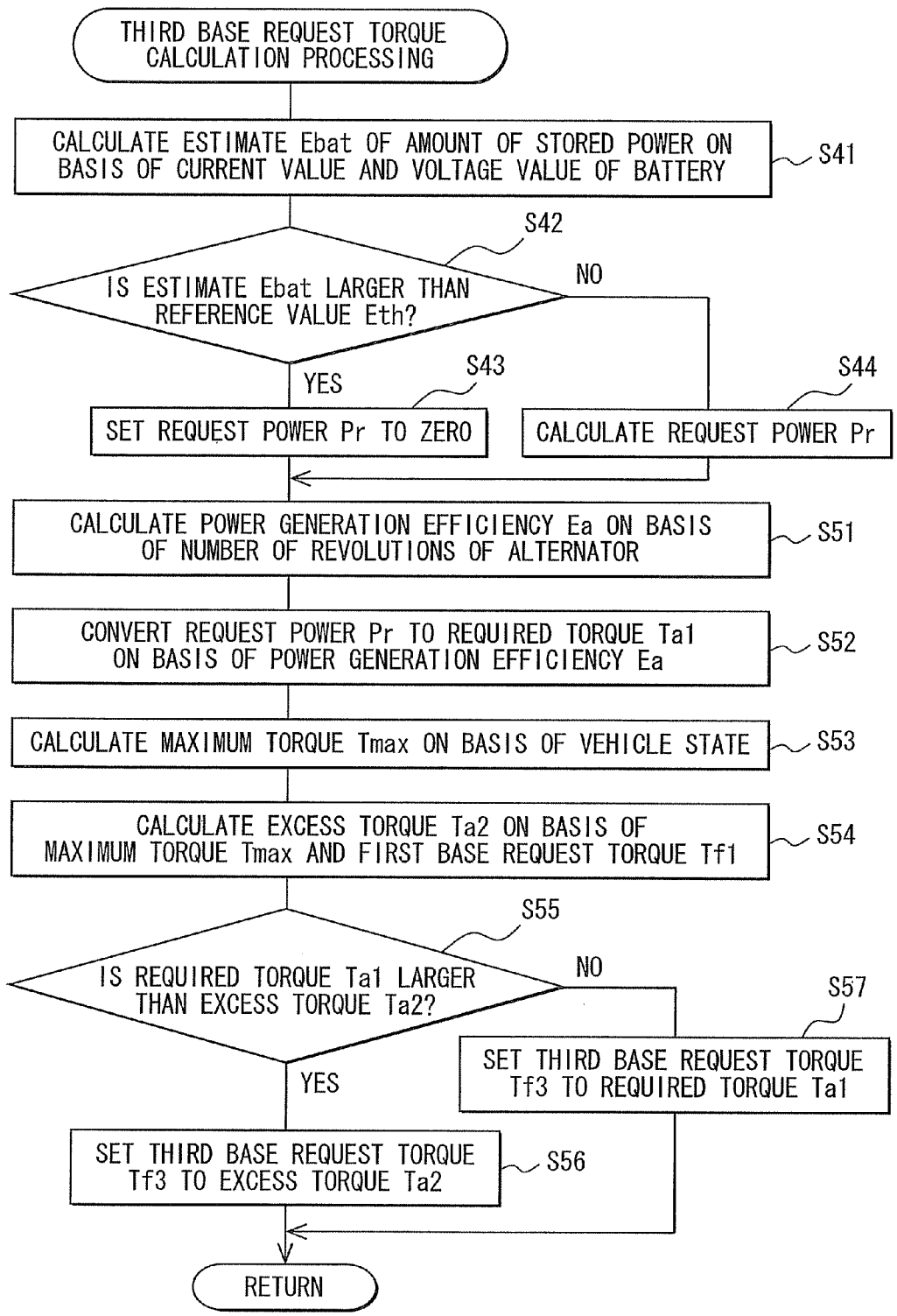
FIG. 7 is a flowchart illustrating exemplary third base request torque calculation processing of an embodiment.

Vehicle control processing to be executed by the vehicle motion control device 1 having the foregoing constitution will be described with reference to the flowcharts of FIG. 4 to FIG. 7. Herein, FIG. 4 is a flowchart presenting an example of a procedure of vehicle motion control processing. Moreover, FIG. 5 to FIG. 7 are flowcharts presenting examples of procedures of pieces of first to third base request torque calculation processing.

As mentioned in FIG. 4, when vehicle motion control processing is initiated, the vehicle motion control device 1, or more particularly, the base request torque calculation unit 21 executes first base request torque calculation processing as processing of S10.

Figure 5:
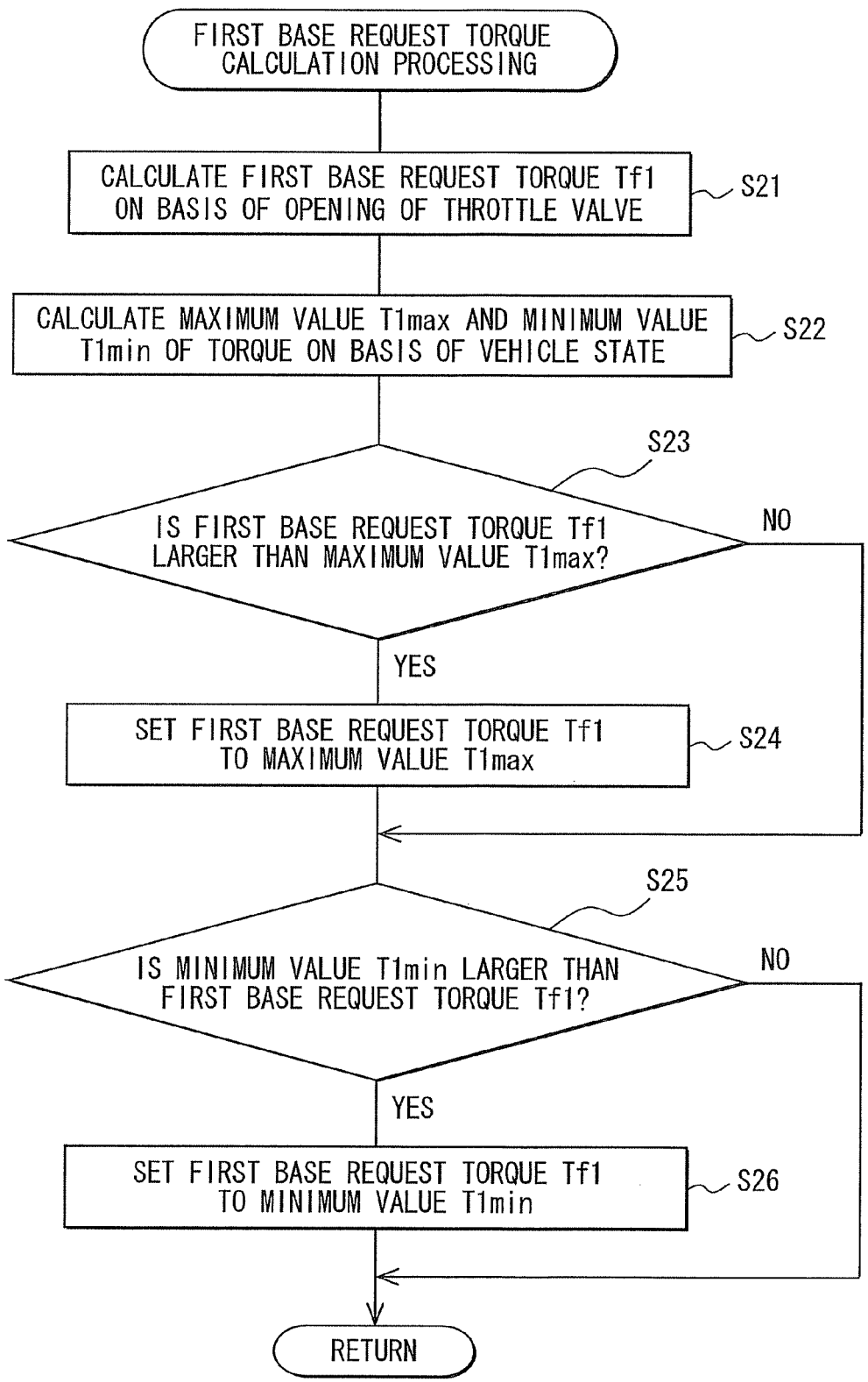
FIG. 5 is a flowchart illustrating exemplary first base request torque calculation processing of an embodiment.

Specifically, as presented in FIG. 5, as processing associated with S21, the base request torque calculation unit 21 reads a stroke of the accelerator pedal detected by the accelerator stroke sensor, that is, the opening of the throttle valve, and calculates the first base request torque Tf1 for the first drive assembly which the driver of the vehicle 100 requests.

After calculating the first base request torque Tf1, as processing associated with S22, the base request torque calculation unit 21 reads a vehicle state detected by the various sensors, and calculates the maximum value T1max and minimum value T1min of a torque that the internal combustion engine 121 can induce in the first output shaft at the time of reading.

After thus calculating the maximum value T1max and minimum value T1min, the base request torque calculation unit 21 decides, as processing of S23, whether the first base request torque Tf1 calculated during the processing of S21 is larger than the maximum value T1max calculated during the processing of S22. If a decision is made that the first base request torque Tf1 is larger than the maximum value T1max, that is, if the deciding processing of S23 is concluded in the affirmative or with Yes, the first base request torque Tf1 cannot be induced in the first output shaft. Therefore, the base request torque calculation unit 21 sets, as processing of S24, the first base request torque Tf1 to the maximum value T1max.

If the first base request torque Tf1 less than or equal to the maximum value T1max, corresponding to NO at S23, the base request torque calculation unit 21 proceeds to execute decision processing at S25. Specifically, the base request torque calculation unit 21 determines at S25 whether the minimum value T1min calculated, for example, at S22, is larger than the first base request torque Tf1.

If the first base request torque Tf1 is greater than the maximum value T1max, corresponding to YES at S23, the first base request torque Tf1 is set to the maximum value T1max at S24 and the base request torque calculation unit 21 proceeds to execute decision processing at S25. Specifically, the base request torque calculation unit 21 determines whether the minimum value T1min calculated, for example, at S22, is larger than the first base request torque Tf1. When the minimum value T1min is smaller than the first base request torque Tf1, corresponding to NO at S25, no processing is performed on the first base request torque Tf1. It should be noted that in accordance with various exemplary embodiments, the base request torque calculation unit 21 can proceed, for example, to processing of S11 shown and described in connection with FIG. 4.

If the minimum value T1min is larger than the first base request torque Tf1, corresponding to YES at S25, the base request torque calculation unit 21 sets the first base request torque Tf1 to the minimum value T1min at S26. The internal combustion engine 121 therefore induces a torque of at least the minimum value T1min in the first output shaft, after which the base request torque calculation unit 21 can proceed, for example, to processing of S11 shown and described in connection with FIG. 4.

The magnitude of the first base request torque Tf1 can be restricted to be an intermediate value between the maximum value T1max and minimum value T1min attained at a given time. Thus, after completing execution of the first base request torque calculation processing at S10 as shown in FIG. 4 and described above in connection with FIG. 5, the base request torque calculation unit 21 executes the second base request torque calculation processing at S11 of FIG. 4 and described below in connection with FIG. 6.

Specifically, the base request torque calculation unit 21 reads a stroke of the accelerator pedal detected by the accelerator stroke sensor, which can correspond, for example, to the opening of the throttle valve requested by the driver of the vehicle 100. The second base request torque Tf2 for the second drive assembly is calculated at S31 on the basis of, for example, the opening of the throttle valve.

After calculating the second base request torque Tf2, the base request torque calculation unit 21 reads the maximum value T2max and minimum value T2min, which represent limits for torques that can be induced in the second output shaft using the motor generator 131, from the storage holding means at S32.

After reading the maximum value T2max and minimum value T2min, the base request torque calculation unit 21 determines at S33 whether the second base request torque Tf2 calculated during the processing of S31 is larger than the maximum value T2max read during the processing of S32. If the second base request torque Tf2 is larger than the maximum value T2max, corresponding to YES at S33, the second basis request torque Tf2 is not induced in the second output shaft and the base request torque calculation unit 21 sets the second base request torque Tf2 to the maximum value T2max at S34.

If the second base request torque Tf2 is less than or equal to the maximum value T2max, corresponding to NO at S33, or after the second base request torque Tf2 is set to the maximum value T2max at S34, the base request torque calculation unit 21 determines whether the minimum value T2min calculated during the processing of S32 is larger than the second base request torque Tf2 at S35.

If the minimum value T2min calculated during the processing of S32 is less than or equal to the second base request torque Tf2, corresponding to NO at S33, the base request torque calculation unit 21 performs no processing on the second base request torque Tf2 and proceeds to S12 as shown and described in connection with FIG. 4.

On the other hand, the minimum value T2min is larger than the second base request torque Tf2, corresponding to YES at S35, the base request torque calculation unit 21 sets the second base request torque Tf2 to the minimum value T2min at S36, whereupon the motor generator 131 induces a torque of at least the minimum value T2min in the second output shaft and proceeds to S12 as shown and described in connection with FIG. 4.

The magnitude of the second base request torque Tf2 is restricted to be an intermediate value between the maximum value T2max and minimum value T2min attained at that time. After completing execution of the processing of S11, the base request torque calculation unit 21 executes third base request torque calculation processing at S12 as shown and described in connection with FIG. 4, and as described in further detail herein below.

Specifically, as shown and described in connection with FIG. 7, the battery state estimation unit 11 obtains the current value and voltage value of electrical energy stored in the battery 111 from the current sensor and voltage sensor respectively, and calculates the estimate Ebat of an amount of stored power at S41 on the basis of the obtained current and voltage values. After calculating the estimate Ebat of the amount of power, the battery state estimation unit 11 calculates a request power Pr on the basis of a short amount of power, by which the calculated estimate Ebat is smaller than the reference value Eth, as determined for example, in accordance with the above described arbitrary function F(x).

Specifically, the battery state estimation unit 11 determines at S42 whether the estimate Ebat calculated during the processing of S41 is larger than the reference value Eth stored and held in the storage holding means. If the estimate Ebat is larger than the reference value Eth, corresponding to YES at S42, the amount of stored power of the battery 111 can be deemed sufficient. The battery state estimation unit 11 sets the request power Pr to zeros at S43. If the estimate Ebat is larger than the reference value Eth, corresponding to NO at S42, the battery 111 must be charged and therefore, the battery state estimation unit 11 calculates the request power Pr, for example, according to Pr=F(Eth−Ebat), at S44. The battery state estimation unit 11 outputs the request power Pr to the alternator request torque calculation unit 12 connected in the succeeding stage as shown, for example, in FIG. 2.

After calculating the request power Pr, the alternator request torque calculation unit 12 obtains the number of revolutions per unit hour from the alternator 122 connected in the preceding stage, and calculates the power generation efficiency Ea at S51. The alternator request torque calculation unit 12 converts the request power Pr to required torque Ta1, which can refer to the torque the alternator 122 requires for generating the request power Pr calculated during the processing of S41 to S44, in consideration of the power generation efficiency Ea calculated at S51.

The alternator request torque calculation unit 12 obtains data concerning the state of the internal combustion engine 122 from the various sensors connected in the preceding stage, and calculates, at 53, the maximum torque Tmax which the internal combustion engine 121 can induce in the first output shaft based on the vehicle state as defined, for example, by the data. The alternator request torque calculation unit 12 calculates, at 54, the excess torque Ta2, for example, by subtracting the first base request torque Tf1, the calculation of which is described above in connection with S21, from the maximum torque Tmax calculated as described herein above during the processing of S53.

Thereafter, the alternator request torque calculation unit 12 determines whether the required torque Ta1 calculated during the processing of S52 is larger than the excess torque Ta2 calculated during the processing of S54 at S55. If the required torque Ta1 is larger than the excess torque Ta2, corresponding to YES at S55, the alternator request torque calculation unit 12 sets the third base request torque Tf3 to the excess torque Ta2 at S56. On the other hand, if the required torque Ta is less than or equal to the excess torque Ta2, corresponding to NO at S55, the alternator request torque calculation unit 12 sets the third base request torque Tf3 to the required torque Ta1 at S57

After the third request torque Tf3 is calculated as described above, the vehicle motion control device 1, or more particularly, the correction torque calculation unit 31 calculates the first and second correction torques Tcdf1 and Tc2, at S13 as shown and described in connection with FIG. 4. Specifically, as shown in FIG. 3, the correction torque calculation unit 31 obtains the states of the components of the vehicle 100 detected by the various sensors, and estimates the vibrational states of the components of the vehicle 100. The correction torque calculation unit 31 calculates the first correction torque Tc1 for the first base request torque Tf1, which is used to adjust vibrations in a low-frequency band of the vibrations of the components of the vehicle 100, and the second correction torque Tc2 for the second base request torque Tf2, which is used to adjust, such as to increase or decrease, vibrations in a high-frequency band of the vibrations of the components of the vehicle 100, on the basis of a low-frequency band model and a high-frequency band model respectively.

Returning again to FIG. 4, the vehicle motion control device 1 corrects the first base request torque Tf1 using the first correction torque Tc1 and third base request torque Tf3 at S14. As shown in the diagram of FIG. 2, the vehicle motion control device 1 corrects the first base request torque Tf1 by adding the third base request torque Tf3 to the first base request torque Tf1 and subtracting the first correction torque Tc1 from the first base request torque Tf1. The vehicle motion control device 1 corrects the second base request torque Tf2 using the second correction torque Tc2 at S15. As shown in FIG. 2, the vehicle motion control device 1 corrects the second base request torque Tf2 by subtracting the second correction torque Tc2 from the second base request torque Tf2.

After the first request torque Tr1, second request torque Tr2, and third base request torque Tf3 are calculated, the vehicle motion control device 1, or more particularly, the internal combustion engine control unit 22 as well as the motor generator control unit 32 and alternator control unit 13 cause, for example in S16 to S18, the internal combustion engine 121 as well as the motor generator 131 and alternator 122 to induce the torques in the first and second output shafts.

In the exemplary vehicle motion control device, the first base request torque Tf1 corrected with the first correction torque Tc1 is induced in the first output shaft. The first base request torque Tf1 is calculated in response to a request made by the driver of the vehicle 100, and is used to minimize vibrations in a low-frequency band of the vibrations of the components of the vehicle 100. The first base request torque Tf1 corrected with the first correction torque Tc1 is induced in the first output shaft by the first drive assembly including the internal combustion engine 121. Consequently, while the request of the driver is met, occurrence of the vibrations in the low-frequency band such as the pitching motion of the vehicle 100 and the bouncing motion thereof can be prevented.

The second base request torque Tf2 corrected with the second correction torque Tc2 is induced in the second output shaft. The second base request torque Tc2 is calculated in response to a request made by the driver of the vehicle 100, and is used to minimize vibrations in a high-frequency band of the vibrations of the components of the vehicle 100. The second base request torque Tf2 corrected with the second correction torque Tc2 is induced in the second output shaft by the second drive assembly including the motor generator 131. Consequently, while the request of the driver is met, occurrence of the vibrations in the high-frequency band including vibrations of tires can be prevented.

Since the vibrations in the low-frequency band and in the high-frequency band in the vehicle 100 can be prevented, oscillation of a load acting the tires is reduced significantly or eliminated. Therefore, the tires stably come into contact with a road at all times and fluctuation of a maximum force to be transmitted to the road via the tires is also reduced significantly or eliminated. Consequently, disturbances in the acceleration of the vehicle 100 can be prevented. Vehicle motion that meets an intention of the driver of the vehicle can be realized.

When the vehicle 100 is turned, the correction torque calculation unit 31 calculates the second correction torque Tc2 that causes a vibration of the wheel on the side of the turning direction of the pair of rear wheels 102L and 102R to increase and causes a vibration of the wheel on the side opposite to the side of the turning direction of the pair of rear wheels 102L and 102R to decrease. Moreover, the correction torque calculation unit 31 calculates the first correction torque Tc1 that causes a vibration of the wheel on the side of the turning direction of the pair of front wheels 101L and 101R to decrease and causes a vibration of the wheel on the side opposite to the side of the turning direction of the pair of front wheels 101L and 101R to increase.

The vibration occurring in the one of rear wheels 102L and 102R on the side of the turning direction is increased, and the oscillation in the load acting on the tire is increased. The vibration occurring in the one of the rear wheels 102L and 102R on the side opposite to the side of the turning direction is decreased, and the oscillation in the load acting on the tire is decreased. Therefore, the tire on the side opposite to the side of the turning direction comes into contact with a road more stably than the tire on the side of the turning direction. The vibration occurring in the one of the front wheels 101L and 101R on the side of the turning direction is decreased, and oscillation associated with the load acting on the tire is decreased. The vibration occurring in the one of the front wheels 101L and 101R on the side opposite to the side of the turning direction is increased, and the oscillation in the load acting on the tire is increased. Therefore, the tire on the side of the turning direction comes into contact with a road more stably than the tire on the side opposite to the side of the turning direction does. Consequently, the yaw moment exhibited by the vehicle 100 can be increased in the turning direction of the vehicle. As a result, the turning performance of the vehicle can be improved.

Figure 8:
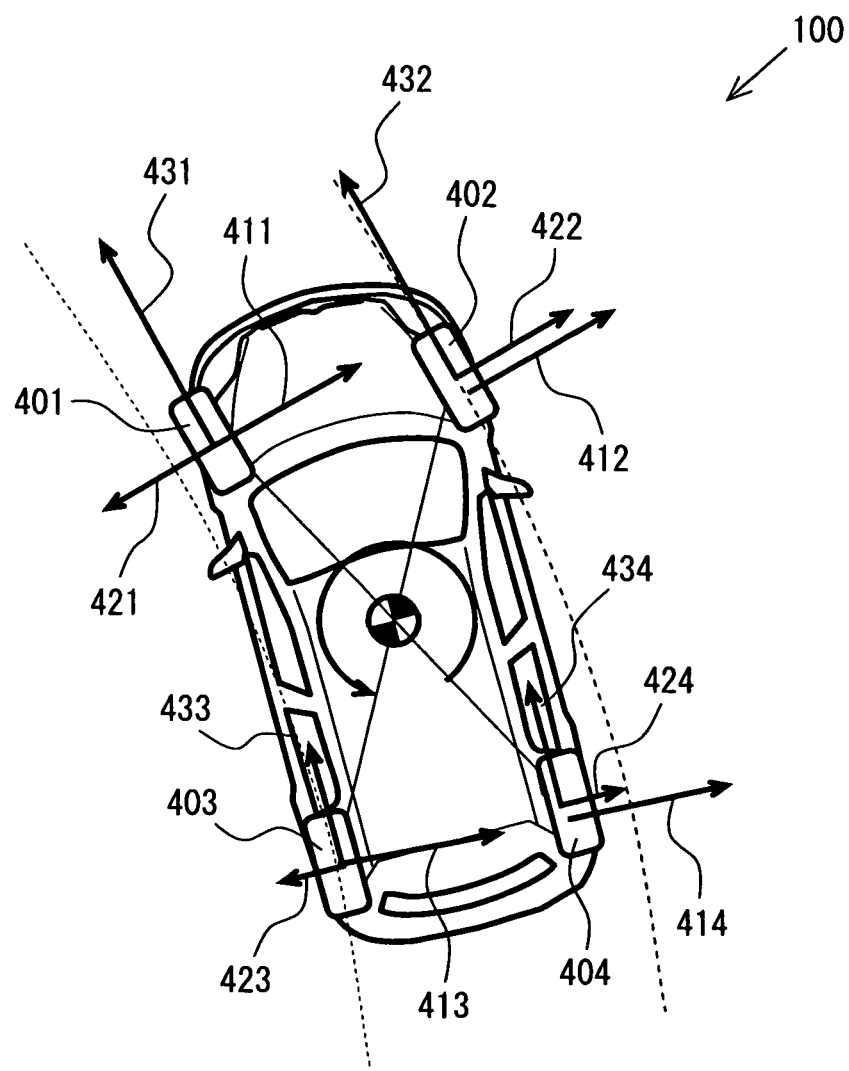
FIG. 8 is a diagram illustrating exemplary motions in a planar direction associated with a four-wheel-drive vehicle equipped with a vehicle motion control device of an embodiment.

Referring to FIG. 8, an example of the movement components of a four-wheel-drive vehicle in which the vehicle motion control device of the present embodiment is mounted will be described below. The motion of the exemplary vehicle in a plane corresponding figuratively to a road or running surface is controlled by the vehicle motion control device of the present embodiment.

As shown in FIG. 8, while the vehicle 100 is run, longitudinal components 431, 432, 433, and 434 exerted in a back-and-forth direction of a driving force, which are controllable by the first and second drive assemblies, are delivered to the tires 401, 402, 403, and 404. Lateral components 421, 422, 423, and 424 exerted in lateral directions of the driving force are also delivered to the tires 401, 402, 403, and 404. It should be noted that the lateral components of the driving force are derived from the camber angles and the static toe angles of the respective wheels.

When the vehicle 100 is turned, for example, to the left, the forces in the lateral directions delivered from the tires 401, 402, 403, and 404 respectively to a road come to result in the lateral components 421, 422, 423, and 424 representing forces in the directions of the driving force. The centrifugal components 411, 412, 413, and 414 are forces that are determined based on a vehicle velocity and a turning radius. The combined resultant forces are sustained by frictional forces working among the road and tires. The tires are likely to experience slip on the road when the resultant forces overcome the frictional forces.

Since the vehicle 100 is turned to the left, the base correction torque calculation unit 31 calculates the second correction torque Tc2 that causes a vibration that occurs in the tire 403 on the side of the turning direction to increase, and in the tire 404 on the side opposite to turning direction to decrease. Further, since the vehicle 100 is turned to the left, the base correction torque calculation unit 31 calculates the first correction torque Tc1 that causes a vibration that occurs in the tire 401 on the side of the turning direction to decrease and that causes a vibration in the tire 402 on the side opposite to the turning direction to increase. Consequently, the load on the tire 404 is reliably delivered to a road. Eventually, a frictional force capable of sustaining the component 424 in the lateral direction of the driving force and the centrifugal force 414 can be ensured, and the slip in the lateral direction of the tire 404 can be suppressed. On the other hand, since the load on the tire 403 is not fully delivered to the road, the frictional force that sustains the component 432 in the lateral direction of the driving force and the centrifugal force 413 decreases, and the slip in the lateral direction of the tire 403 increases. Likewise, since the load on the tire 401 is fully delivered to the road, the frictional force capable of sustaining the component 421 in the lateral direction of the driving force and the centrifugal force 411 can be ensured, and the slip in the lateral direction of the tire 401 can be suppressed. On the other hand, since the load on the tire 402 is not fully delivered to the road, the frictional force that sustains the component 422 in the lateral direction of the driving force and the centrifugal force 412 decreases, and the slip in the lateral direction of the tire 402 increases. Consequently, the yaw moment exhibited by the vehicle 100 can be grown leftward or in the turning direction of the vehicle 100. Namely, the turning performance of the vehicle 100 can be improved.

The vehicle motion control device is not limited to the above described embodiments and can be implemented in various alternative embodiments as described below.

Figure 9:
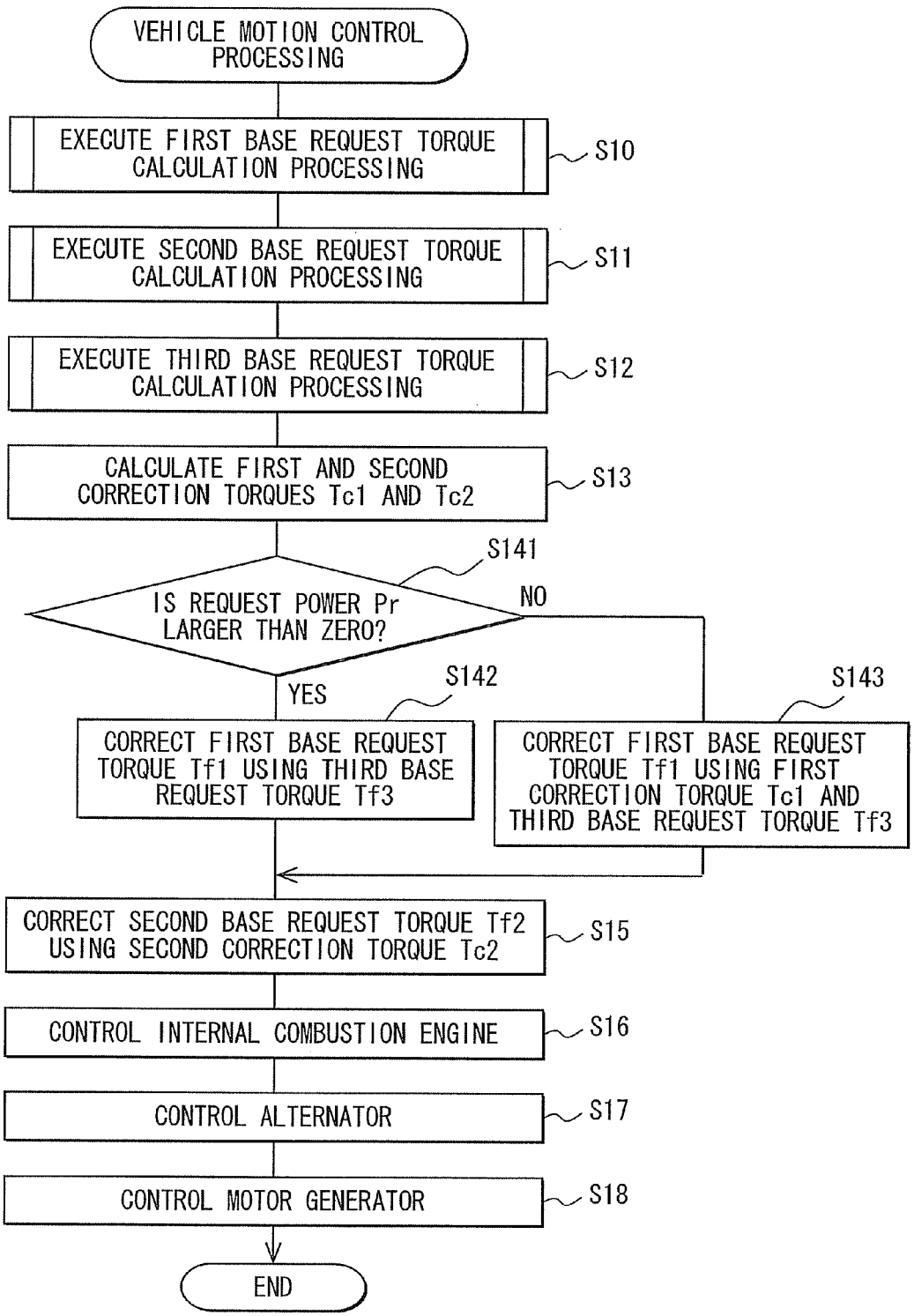
FIG. 9 is a flowchart illustrating a variant of the vehicle motion control processing of an embodiment.

In the above described embodiment, for example in connection with S14 in FIG. 4, the first base request torque Tf1 is corrected using the first correction torque Tc1 and third base request torque Tf3. However, the invention is not so limited. For example, in connection with S141 in FIG. 9, before correcting the first base request torque Tf1 with the third base request torque Tf3, the vehicle motion control device 1 determines whether the request power Pr, as described in connection with S42 to S44, is larger than zero. If the request power Pr is larger than zero, corresponding to YES at S141, the estimate Ebat of an amount of stored power of the battery 111 is equal to or smaller than the reference value Eth leading to a situation in which the amount of power in battery 111 has to be restored as soon as possible. Therefore, the vehicle motion control device 1 may correct the first base request torque Tf1 using the third base request torque Tf3 alone at S142. In other words, correction of the first base request torque Tf1 with the third base request torque Tf3 intended to restore the amount of stored power may be executed as a higher priority than correction of the first base request torque Tf1 with the first correction torque Tc1 intended to suppress vibrations in a low-frequency band. On the other hand, if the request power Pr is zero corresponding to NO at S141, the battery 111 is presumed to be fully charged and processing proceeds to S143, which is the same as processing at S14. The correcting processing is intended to ensure the amount of stored power is not limited to the one mentioned in FIG. 9. In short, correction intended to ensure the amount of charged power should be executed as a higher priority than a correction amount to suppress vibrations.

In the above described embodiment and variants thereof, the smaller one of the required torque Ta1 and excess torque Ta2 can be regarded as the third base request torque Tf3, and added to the first base request torque Tf1 in order to correct the first base request torque Tf1. The addition for correction may be omitted. Nevertheless, the object of the present invention can be accomplished.

In the above described embodiment and variants thereof, the first drive assembly including the internal combustion engine 121 applies a torque to the pair of front wheels, and the second drive assembly including the motor generator 131 applies a torque to the pair of rear wheels. When the vehicle 100 is turned, the correction torque calculation unit 31 calculates the second correction torque Tc2 that causes a vibration occurring in the one of the tires 403 and 404 of the rear wheels on the side opposite to the turning direction, to decrease, and that causes a vibration occurring in the one of the tires 403 and 404 of the rear wheels on the side of the turning direction, to increase. Further, the correction torque calculation unit 31 calculates the first correction torque Tc1 that causes a vibration occurring in the one of the tires 401 and 402 of the front wheels on the side of the turning direction to decrease, and that causes a vibration occurring in the one of the tires 401 and 402 of the front wheels on the side opposite to the turning direction, to increase. Thus, the yaw moment exhibited by the vehicle 100 is increased in the turning direction of the vehicle. The present invention is not limited to the above described embodiment. In particular, when the first drive assembly including the internal combustion engine 121 is used to apply a torque to the pair of rear wheels and the second drive assembly including the motor generator 131 is used to apply a torque to the pair of front wheels, the correction torque calculation unit calculates the first and second correction torques described below. Specifically, when the vehicle 100 is turned, the correction torque calculation unit calculates the second correction torque Tc2 that causes a vibration occurring in the one of the tires 401 and 402 of the front wheels on the side of the turning direction to decrease, and that causes a vibration occurring in the one of the tires 401 and 402 of the front wheels on the side opposite to the turning direction to increase. Further, the correction torque calculation unit calculates the first correction torque Tc1 that causes a vibration occurring in the one of the tires 403 and 404 of the rear wheels tire on the side of the turning direction, to increase, and that causes a vibration occurring in the one of the tires 403 and 404 of the rear wheels on the side opposite to the turning direction to decrease. Thus, the yaw moment exhibited by the vehicle 100 may be increased in the turning direction of the vehicle. It should be noted that in accordance with various embodiments, both the first correction torque Tc1 and second correction torque Tc1 used to improve the turning performance of the vehicle need not be calculated and instead, at least one of the correction torques may be calculated. Nevertheless, the turning performance of the vehicle can be improved. If the yaw moment need not be increased at the time of turning the vehicle 100, the first correction torque Tc1 and the second correction torque Tc2 need not be calculated, while still achieving the objective of increasing stability and traction.

In the above described embodiments and variants thereof, the internal combustion engine and alternator, for example, are adopted as the first drive assembly that drives the first pair of wheels, and the motor generator, for example, is adopted as the second drive assembly that drives the second pair of wheels. However, the invention is not limited to such described embodiments. For example, the internal combustion engine and motor generator may be adopted as the first drive assembly that drives the first pair of wheels, and the motor generator, for example, may be adopted as the second drive assembly that drives the second pair of wheels. Moreover, the combination of components serving as the first drive assembly and the combination of components serving as the second drive assembly may be interchanged.

What is claimed is:

1. A vehicle running control device mounted in a four-wheel-drive vehicle, the vehicle running control device controlling running operation of the four-wheel-drive vehicle having: a first drive assembly including an internal combustion engine generating a first torque in a first output shaft coupled to a first pair of wheels; a second drive assembly including a motor generating a second torque in a second output shaft coupled to a second pair of wheels, the second drive assembly independent of the first drive assembly; and means for detecting states of components of the vehicle, the vehicle running control device comprising:
   a base request torque calculation unit calculating a first base request torque for the first drive assembly and a second base request torque for the second drive assembly in response to a request received from a driver of the vehicle;
   a correction torque calculation unit that estimates vibrational states of the components of the vehicle on the basis of the detected states of the components of the vehicle, and calculates a first correction torque for correcting the first base request torque, the first correction torque used to increase or decrease vibrations in a low-frequency band of vibration frequencies of up and down vibrations exerted to tires of the vehicle, and a second correction torque for correcting the second base request torque, the second correction torque used to increase or decrease vibrations in a high-frequency band of the vibration frequencies of the up and down vibrations; and
   first and second control units that control the internal combustion engine and motor, respectively, so that the first base request torque and the second base request torque are corrected with the first correction torque and the second correction torque, respectively, to provide a first base corrected request torque and a second base corrected request torque which are to be outputted from the first drive assembly and the second drive assembly, respectively.

2. The vehicle running control device according to claim 1, wherein the correction torque calculation unit calculates the first correction torque on the basis of a low-frequency band model modeling low-frequency band vibrations of the components of the vehicle, and calculates the second correction torque on the basis of a high-frequency band model modeling high-frequency band vibrations of the components of the vehicle.

3. The vehicle running control device according to claim 2, wherein the low-frequency band model includes a first spring-mass model modeling vibrations associated with a vehicle body accommodating occupants.

4. The vehicle running control device according to claim 3,
   wherein the first drive assembly applies the first torque to the first output shaft coupled to the first pair of wheels, which are front wheels of the vehicle, to increase or decrease vibrations of the vehicle, and
   the correction torque calculation unit calculates the first correction torque that causes a vibration, which occurs in a wheel on a side of a turning direction of the pair of front wheels, to decrease and that causes a vibration, which occurs in a wheel on a side opposite to the side of the turning direction of the pair of front wheels, to increase, when the vehicle is turned, thereby to control a turning motion of the vehicle.

5. The vehicle running control device according to claim 2, wherein the high-frequency band model includes a second spring-mass model modeling a chassis frame bearing a vehicle body and tires joined to the chassis frame.

6. The vehicle running control device according to claim 5, wherein
the second drive assembly applies the second torque to the second output shaft coupled to the second pair of wheels, which are rear wheels of the vehicle, to increase or decrease vibrations of the chassis frame and the tires joined to the chassis frame, and
the correction torque calculation unit calculates the second correction torque that causes a vibration, which occurs in a wheel on a side of a turning direction of the pair of rear wheels, to decrease and that causes a vibration, which occurs in a wheel on a side opposite to the side of the turning direction of the pair of rear wheels, to increase, when the vehicle is turned, thereby to control a turning motion of the vehicle.

7. The vehicle running control device according to claim 1, wherein the four-wheel-drive vehicle includes a power storage unit connected to and feeding power to the motor, and a generator that uses the first torque of the first output shaft to generate electricity to charge the power storage unit, the generator having a relatively higher frequency response than the internal combustion engine.

8. The vehicle running control device according to claim 7, further comprising a generator request torque calculation unit that calculates a required torque, as a third base request torque, required by the generator for generating a first amount of the electricity necessary to retain a second amount of stored power at a predetermined reference level on the basis of the second amount of stored power and a power generation efficiency factor of the generator, wherein:
the first control unit controls the internal combustion engine so that the first base request torque will be corrected with the third base request torque.

9. The vehicle running control device according to claim 8, wherein the generator request torque calculation unit calculates an excess torque which the internal combustion engine can induce in the first output shaft in addition to the first base request torque, the third base request torque being the smaller of the excess torque and the required torque.

10. The vehicle running control device according to claim 9, wherein when the second amount of stored power falls below the reference value, the first control unit performs correction of the first base request torque using the third base request torque with a higher priority than performing correction of the first base request torque using the first correction torque.

* * * * *